July 7, 1936.　　　　A. HOCHE　　　　2,046,821
ESTERIFICATION PROCESS
Filed Sept. 9, 1935
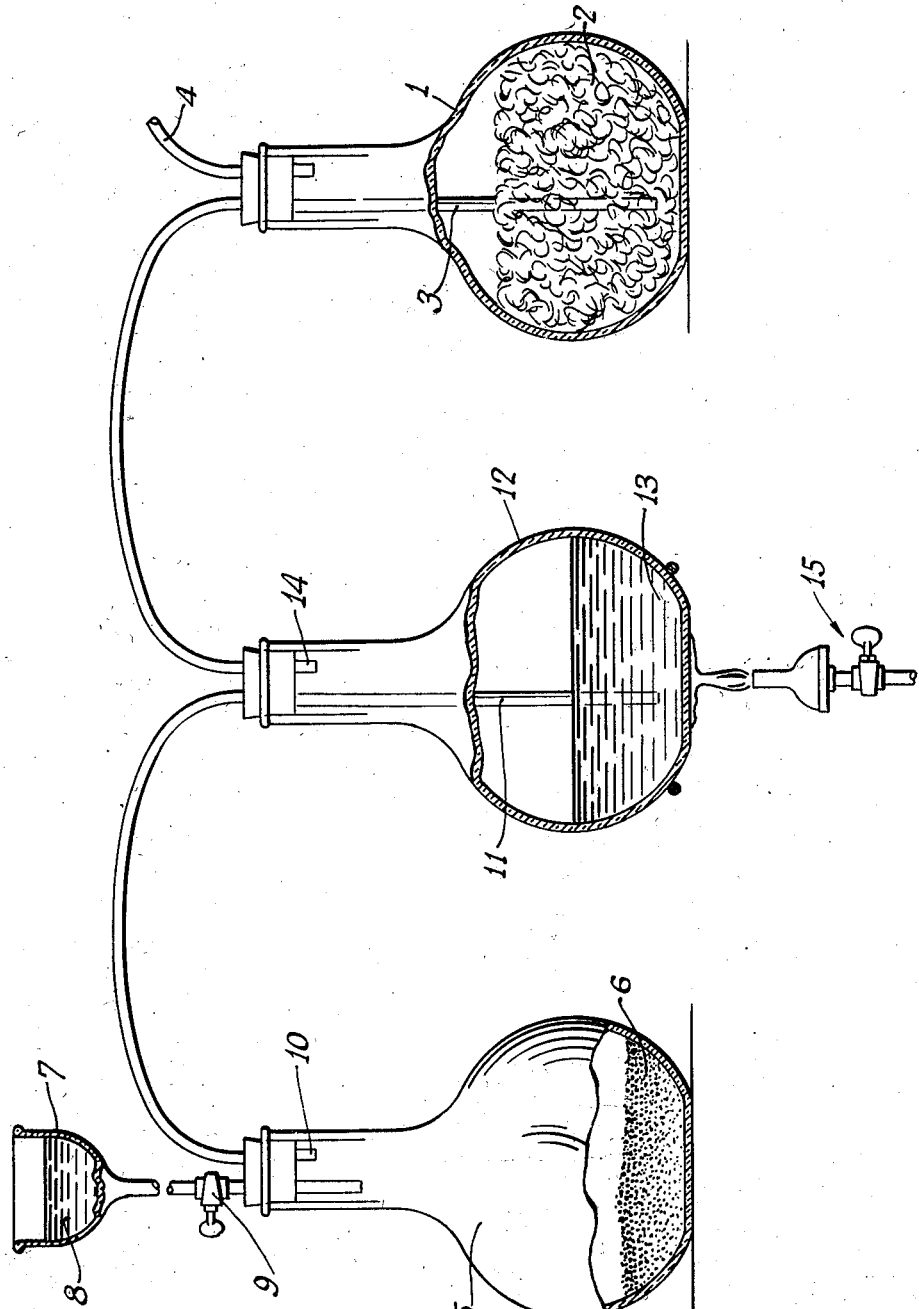
INVENTOR
Adam Hoche
BY
Lyman E. Dodge
ATTORNEY Patented July 7, 1936

2,046,821

UNITED STATES PATENT OFFICE 2,046,821

ESTERIFICATION PROCESS

Adam Hoche, Brooklyn, N. Y.

Application September 9, 1935, Serial No. 39,694

6 Claims. (Cl. 260—101)

This invention relates to chemistry, especially to cellulose, and particularly to a cellulose ester.

A principal object of this invention is the provision of a process for the production of a cellulose ester.

A further object of this invention is the provision of a process of the kind specified which is inexpensive and efficient.

Other objects and advantages will appear as the description of the invention, and a particular illustrative form of apparatus used in carrying out the invention progresses, and the novel features will be particularly pointed out in the appended claims.

In describing the invention in detail and the particular form of apparatus selected to illustrate the invention, reference will be had to the accompanying drawing, consisting of a single schematic view, and the reference characters thereon.

The process of my invention, broadly considered, is a process for the production of cellulose acetate from cellulose, calcium carbide, and water.

In general, I treat a moist cellulose having about 2% of nitric acid therein with the products which result from passing the gases which arise from the contact of water and calcium carbide through a dilute sulphuric acid containing mercuric oxide.

In carrying out my process, I place such moist cellulose in a suitable vessel, arranged to receive a gaseous product beneath the cellulose. The cellulose preferably contains about 300% moisture, that is, 1 part of cellulose to 3 parts of water, although in this condition the cellulose exhibits to the eye no apparently free water.

The product of my process forming the subject matter of application for patent Serial No. 751,255, filed November 2, 1934, is particularly suitable for this process if the washing is only carried so far as to leave about 2% nitric acid in the product. This is because the product so produced has a large amount of oxycellulose therein.

In the drawing, numeral 1 designates a vessel of suitable material, such as glass, in which a mass of moist cellulose 2 containing about 2% nitric acid is placed. The vessel is fitted with a tube 3 which extends underneath or nearly underneath the mass of cellulose. The tube 4 extends only slightly into the vessel and serves to conduct away any unused gases. These unused gases may be conducted to another vessel identical with vessel 1 or a series of such vessels, and similarly fitted and filled for the purpose of obviating any waste of the gases.

To produce the gas or vapor with which the cellulose is treated, I arrange a suitable apparatus for generating acetylene from crude calcium carbide. 5 is a suitable vessel, preferably made of glass, into which I place a suitable or convenient quantity of lump or broken or powdered calcium carbide 6. Onto the carbide, I drop water in any convenient manner, as from the vessel 7, mounted to deliver water 8 into the vessel 5 in desired quantity, regulated by valve 9.

The gases generated in vessel 5 create a pressure sufficient to force them into the tube 10 connecting to tube 11. Tube 11 is positioned in another vessel 12, preferably of acid resisting material, such as glass, like vessels 1 and 2. Vessel 12 is partially filled with water solution of sulphuric acid, 13 about 1% to 20% of acid, in which is placed about 1 to 15 grams of mercuric oxide to one liter of solution.

From the top portion of vessel 12, a tube 14 extends connecting with tube 3 of vessel 1.

In carrying out the process, the water is allowed to drop upon the crude calcium carbide and the gases formed allowed to flow into tube 11 opening beneath the surface of the dilute sulphuric acid and mercuric oxide in vessel 12. The supply of gases is continued until the sulphuric acid solution is thoroughly saturated, which will take about one hour, depending upon the rapidity of flow.

After the dilute sulphuric acid solution is saturated with the gases from the crude calcium carbide, it is heated in any suitable or appropriate manner, as by means of gas heater 15, to about 60° to 70° centigrade.

When vessel 12 is heated, a copious flow of vapor goes over into vessel 1 and beneath the moist cellulose. This vapor reacts with the cellulose and in from about 15 minutes to one hour the contents of vessel 1 is a somewhat syrupy liquid.

If the syrupy liquid of vessel 1 is poured into water in excess, a white precipitate of cellulose acetate is obtained which may be separated in the ordinary manner as by a centrifuge, and then water washed free of acids or other chemicals, and may then be dried by usual methods.

The cellulose acetate produced may be used for all of the usual purposes for which present commercial cellulose acetate is used.

It is believed that the gas generated from the crude calcium carbide is not pure acetylene but contains a minute quantity of another or other gases which assist the reaction in the dilute sulphuric acid vessel, where the mercuric oxide seems to act as a catalyst, to produce acetaldehyde, and then that passes into vessel 1 and reacts with the cellulose containing about 2% nitric acid to produce cellulose acetate. It is possible that the acetaldehyde is oxidized to acetic acid and that some acetic anhydride is formed.

Although I have particularly described my invention and a particular specific form of apparatus for carrying out my process, I desire to have it understood that the apparatus selected is merely illustrative, and does not exhaust the possible forms of suitable apparatus.

What I claim as new and desire to secure by Letters Patent of the United States, is:

1. A process for esterifying cellulose which consists in subjecting moist cellulose containing 2% nitric acid to the vapor of acetaldehyde.

2. A process for esterifying cellulose which consists in subjecting a mass consisting of about one part cellulose and 3 parts water and about 2% nitric acid to the vapor of acetaldehyde.

3. A process for esterifying cellulose which consists in subjecting a mass consisting of about one part cellulose and 3 parts water and about 2% nitric acid to the vapor of acetaldehyde, for about 15 minutes to one hour.

4. A process of producing cellulose acetate which consists in generating gases by the action of water on crude calcium carbide, leading the gases into a dilute water solution of sulphuric acid containing mercuric oxide, heating the dilute sulphuric acid solution and leading the vapors into a mass of moist cellulose containing about 2% of nitric acid.

5. The method of generating an acetylating agent for cellulose which consists in generating gases by the action of water on crude calcium carbide, leading the gases into a water solution of sulphuric acid containing from about 1% to 20% of acid and about 1 to 15 grams of mercuric oxide per liter of solution, and heating the solution to about 60° to 70 centigrade and utilizing the vapors as an acetylating agent.

6. The process of producing cellulose acetate which consists in subjecting moist cellulose containing about 2% of nitric acid to the action of the vapor of acetaldehyde until a syrupy liquid is produced, then mixing that liquid with water, and then separating, in the pure state, the precipitate produced.

ADAM HOCHE.